United States Patent [19]

Mackaness

[11] 4,111,374
[45] Sep. 5, 1978

[54] COMMODITY CONVEYING MEANS

[76] Inventor: James B. Mackaness, 28 The Crescent, Cheltenham, N.S.W., Australia, 2119

[21] Appl. No.: 802,270

[22] Filed: May 31, 1977

Related U.S. Application Data

[63] Continuation-in-part of Ser. No. 655,441, Feb. 5, 1976, abandoned.

[30] Foreign Application Priority Data

Feb. 5, 1975 [AU] Australia ................. 0477/75

[51] Int. Cl.² .............................................. B02C 23/36
[52] U.S. Cl. ....................... 241/101.7; 405/170; 214/1 PA
[58] Field of Search ............ 241/46 R, 46.11, 101.2, 241/101.7; 214/1 P, 1 PA, 2.5; 61/111

[56] References Cited

U.S. PATENT DOCUMENTS

| Re. 24,907 | 12/1960 | Maydew ..................... 214/2.5 |
| B 462,828 | 3/1976 | Umphrey ..................... 241/46.1 |
| 1,877,974 | 9/1932 | Robb ............................ 214/1 PA |
| 3,336,991 | 9/1967 | Iclem et al. .................. 214/2.5 X |
| 3,561,615 | 2/1971 | Forsberg et al. ............. 214/1 P |
| 3,860,027 | 1/1975 | McCain et al. .............. 302/14 X |
| 3,916,500 | 11/1975 | Brown ......................... 214/1 P X |
| 3,927,770 | 12/1975 | Rekawek ..................... 214/1 P |
| 3,956,901 | 5/1976 | Brown ......................... 214/1 PA X |

Primary Examiner—Howard N. Goldberg
Attorney, Agent, or Firm—John E. Toupal

[57] ABSTRACT

A mobile machine to store pipe lengths to be added to and then removed from a generally horizontal pipeline connected to a mining machine. The mobile machine is provided with a pipe length magazine which can be moved so as to allow any pipe to be transferred from the magazine to a pipe handling position where other means take over control of the pipe to move it axially to engage it with the end of a pipeline.

9 Claims, 14 Drawing Figures

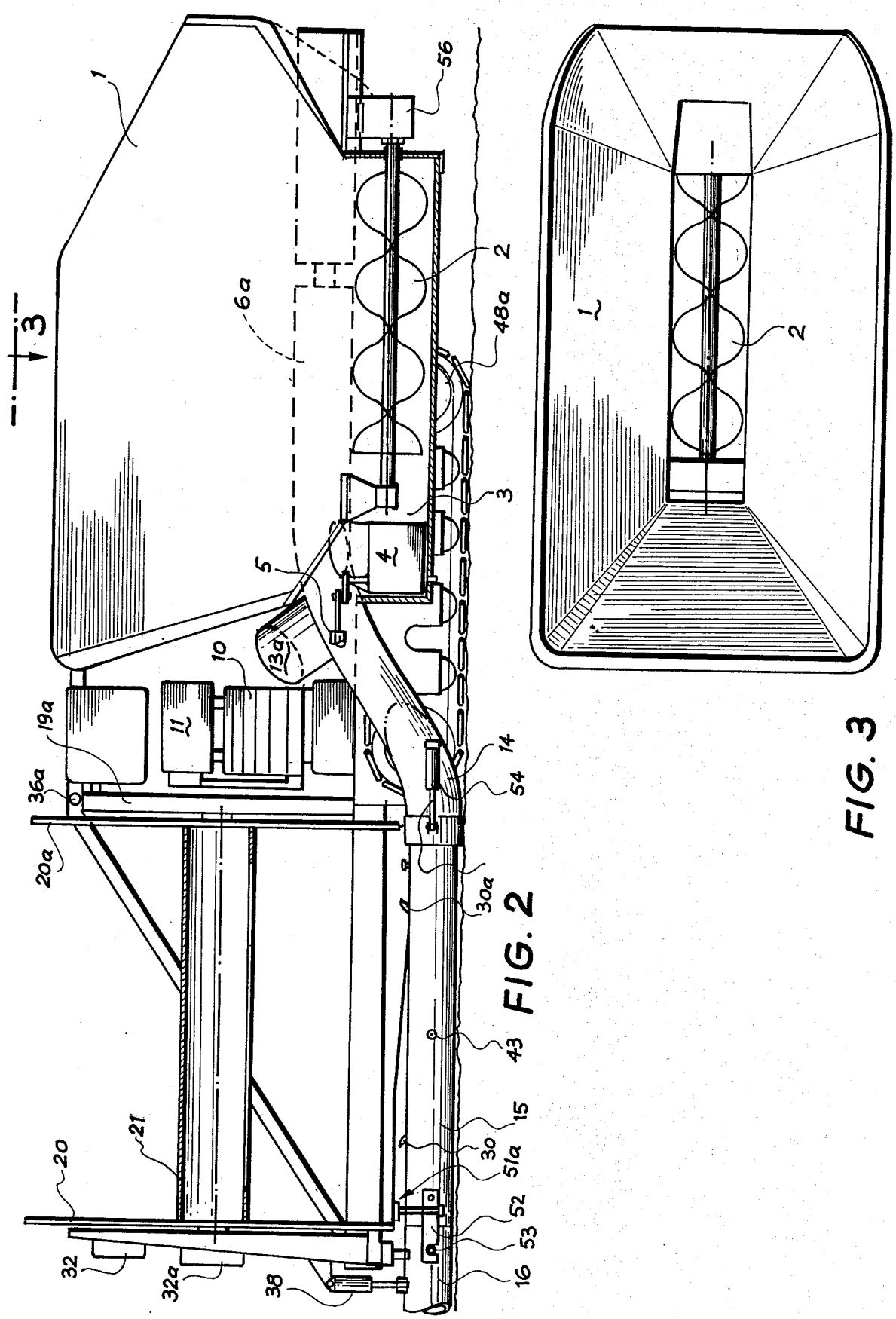

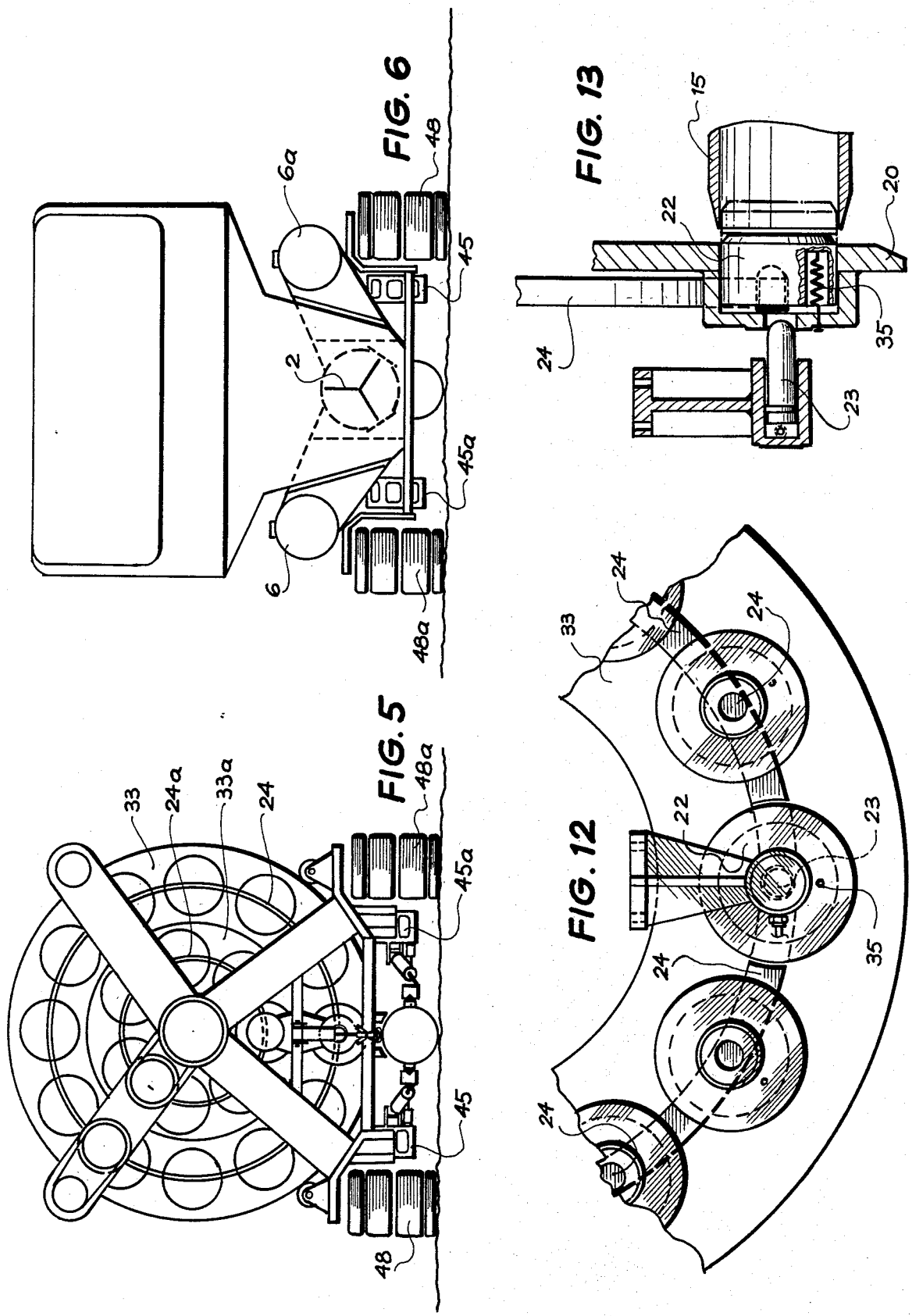

COMMODITY CONVEYING MEANS

CROSS-REFERENCE TO RELATED APPLICATION

This invention is a continuation-in-part of U. S. application Ser. No. 655,441, filed Feb. 5, 1976, and entitled "Commodity Conveying Means", now abandoned.

BACKTROUND OF THE INVENTION

This invention relates to commodity conveying means for use in locations where the commodity to be conveyed is:
(1) particulate and preferably in slurry form
(2) is stored in static state and
(3) is spread over a large area Examples of such commodities would be those in bulk stores of such things as coke, wheat, gravel and the like. The conveying would be of the type in which the commodity is fed through a pipe to be discharged onto a conveyor. Because of the problems entailed by relocation of an entire conveyor as a supply of the commodity at one location is exhausted, it is more desirable to advance a pump used to force the commodity through the pipe toward the conveyor. In order to advance the pump a length of pipe must be added or removed from the run of pipe. It is with the means for readily adding or removing a length of pipe from a pipeline made up of a plurality of lengths that this invention is primarily concerned.

SUMMARY OF THE INVENTION

The invention in its broadest sense comprises a mobile machine to store pipe lengths to be added to and then removed from a generally horizontal pipeline connected to a mining machine, said mobile machine comprising a frame to straddle a generally horizontal pipeline, wheel means on the frame to permit the machine to move along the length of the pipeline, a magazine on the frame to hold the plurality of lengths of pipe, pipe location means associated with the magazine to locate any one of the pipe lengths in the magazine and pipe handling means for either transferring located pipe lengths to a pipe handling position exterior of the magazine or returning them thereto and effective aso to engage or disengage the ends of pipe lengths with the end of the previously laid pipeline.

DESCRIPTION OF THE DRAWINGS

The invention is described with reference to the accompanying drawings in which:

FIG. 2 is a transverse sectional elevation of the machine shown in FIG. 1;

FIG. 3 is a view from above in the direction of arrow 3 of FIG. 2;

FIG. 5 is an end view in the direction of arrow 5 of FIG. 1;

FIG. 6 is an end view in the direction of arrow 6 of FIG. 1;

FIG. 12 and FIG. 13 show details of the means for holding pipe lengths in the magazine.

DESCRIPTION OF THE PREFERRED EMBODIMENT

Figure 1:
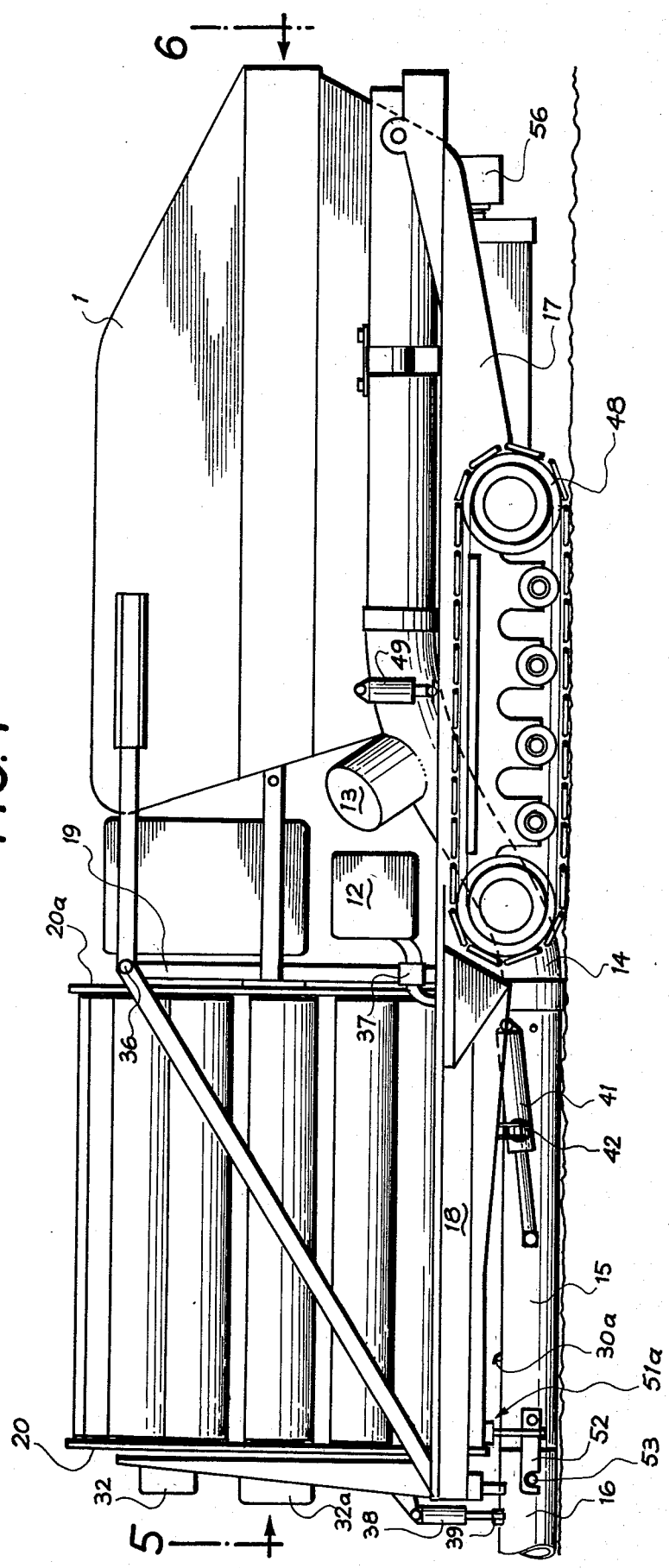
FIG. 1 is a side view of a commodity conveying means according to the invention.
Figure 4:
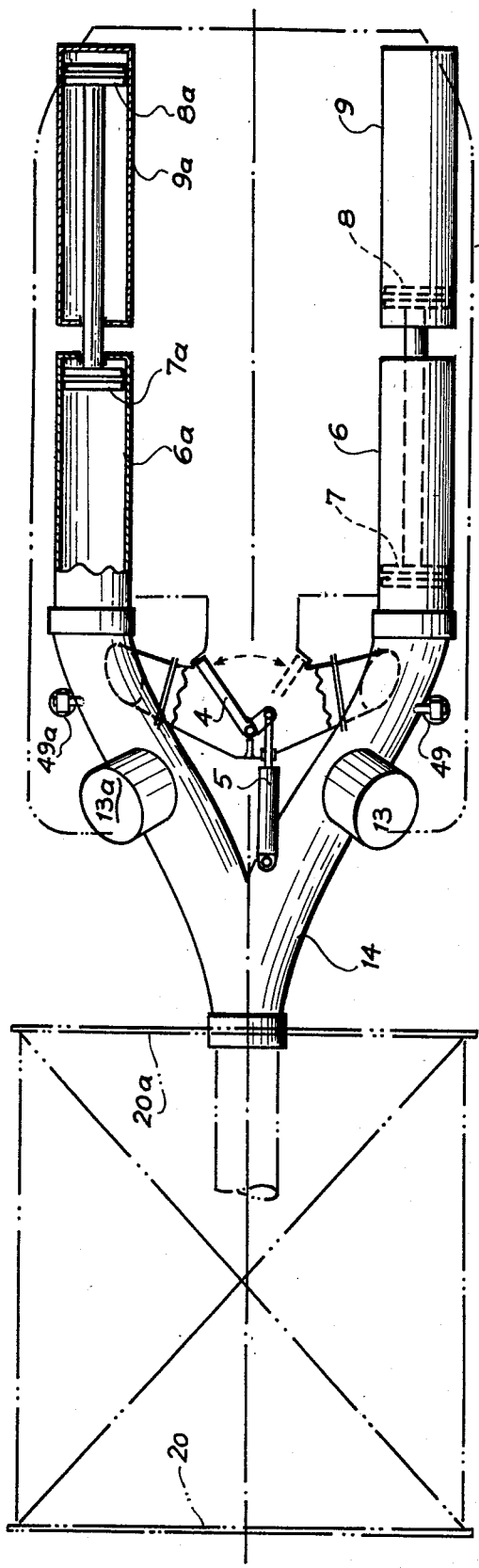
FIG. 4 is a sectional plan view showing the pumping means.
Figure 8:
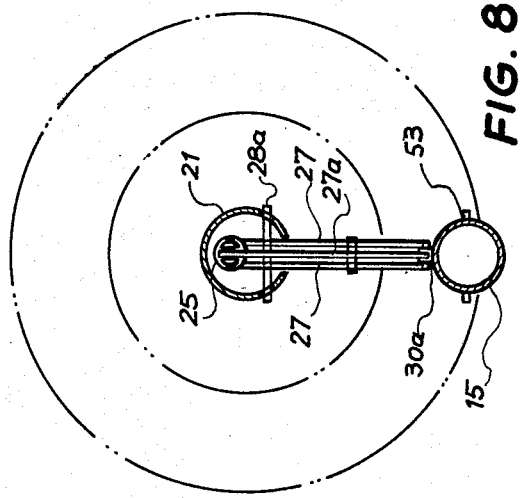
FIG. 8 is a sectional end view on section line 8—8 of FIG. 7.

The commodity conveying apparatus of the present invention includes a bin 1 into which a conveyed particulate material is discharged from a previous operation; e.g. coal cutting. The material falls to the bottom of the bin 1 and is conveyed therefrom by a conventional auger-breaker 2 into a valve chamber 3. Driving the auger-breaker 2 is a hydraulic motor 56. A flap valve 4 actuated by a hydraulic cylinder 5 directs the conveyed material into one or other of two pump cylinders 6 or 6a. The pistons 7 and 7a in the cylinders 6 and 6a, respectively, are actuated alternately by pistons 8 and 8a that are retained in cylinders 9 and 9a. Hydraulic fluid to operate the pistons 8 and 8a in the cylinders 9 and 9a is obtained from a pump 11 which is driven by an electric motor 10. The sequence and other operating requirements of these pistons and other required machine functions are controlled by logic equipment installed in a controller 12.

Commodity discharged from the cylinders 6 and 6a is prevented from returning during the suction stroke of the pistons 7 and 7a by valve assemblies 13 and 13a which are hydraulically operated and are controlled by controller 12. After discharge, the material passes via a "Y" connector 14 to a discharge line, a first pipe length 15 of which is shown attached to connector 14 and a second pipe length 16 is attached to the length 15. Further pipes connect the pipe length 16 to the area in which the material is to be discharged.

To advance the conveying system a new length of pipe is installed between the connector 14 and the pipe 15. This is achieved by a mechanism on a magazine for pipes of uniform length, the mechanism comprising a base frame 17 attached to but removable from a main base 18, frames 19 and 19a fixed to the frame 17, and support end plates 20 and 20a joined by a central tube 21. Retained by the end plates 20 and 20a are rotatably mounted concentric mounting rings that support aligned axially movable end plugs 22. The plugs 22 fit loosely in the bores of the retained pipes and are movable by hydraulically operated pistons 23. During rotation of the rings, the plugs 22 are retained in position by stationary retaining rings 24 and 24a.

Figure 7:
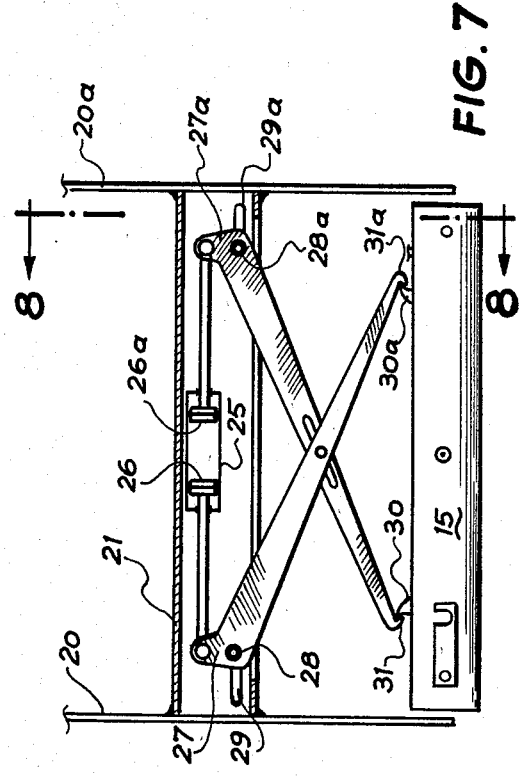
FIG. 7 is a schematic view of the holding and delivery means of the pipe magazine.

Each individual pipe can be raised into position for storage or lowered for use by the hoist mechanism shown in FIG. 7 and constructed in the following manner. The central tube 21 houses a hydraulic cylinder 25 with two pistons 26 and 26a which arcuately move bell crank arms 27 and 27a about pivot pins 28 and 28a. The pivot pins 28 and 28a are slidably mounted in low friction bearings in slots 29 and 29a in the central tube 21.

Under control of the controller 12, the arms 27 and 27a are lowered such that curved ends 31 and 31a on the arms 27 and 27a engage fingers 30 and 30a on a length of pipe. To lift the pipe 15, oil is pumped into the cylinder 25 and the bearing carrying pins 28 move apart to lock the ends 31 and 31a in contact with the fingers 30 and 30a. Further divergent movement of the pins 28 is thus prevented and the bell cranks then rotate about the pins 28 and lift the pipe 15 into the magazine. The ends of the pipe when aligned with one pair of mounting rings are engaged by aligned plugs 22 of that pair of the mounting rings. Rotation of the rings to give access to a pipe length being withdrawn or discharged is produced by a hydraulic motor 32 for the outer ring and a motor 32a for the inner ring. Again, this movement is controlled by the controller 12.

In order to fill the magazine, pipes are arranged below the arms 27 and 27a which are lowered to grip each pipe and raise it either to rings 33 or rings 33a. When the pipe is in position in the magazine, the pistons 23 and 23a push plugs 22 into the bore of the pipe at each end of the pipe. One of the hydraulic motors 32 or 32a is then used to rotate the outer or inner end plates 20 or 20a causing the plugs 22 to be retained by the retaining rings 24 and 24a. The rotation of the plates 20-20a and the hydraulic insertion of the plugs is controlled by the controller 12. Removal of a pipe entails a reversal of this procedure during which hydraulic pressure on the pistons 23 and 23a is released thereby allowing springs 35 to withdraw the plugs 22 retaining a selected pipe.

When full, the magazine can be used to lay lengths of pipe. Spare magazines can be kept for long pipelines and the complete magazine can be coupled to the bin by means of the attachments 36 and 36a and a hydraulic connector link 37.

Figure 11:
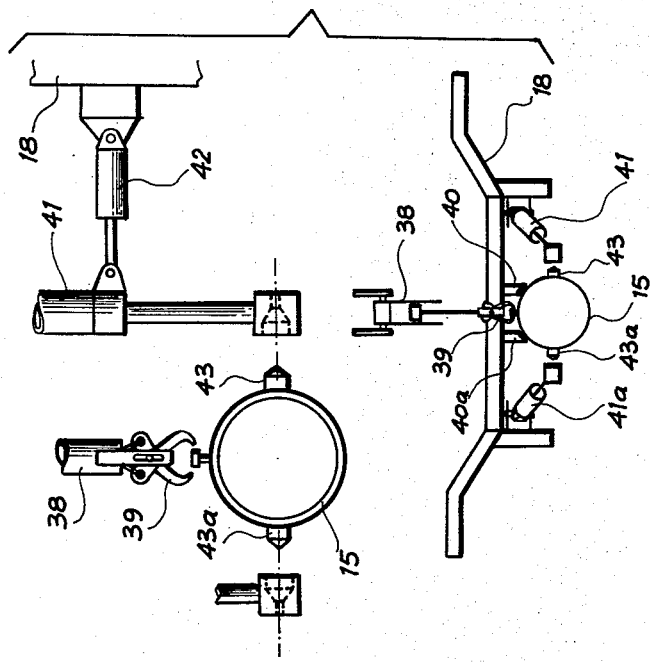
FIG. 11 shows in greater detail some components of the mechanism of FIGS. 9 and 10.
Figure 9:
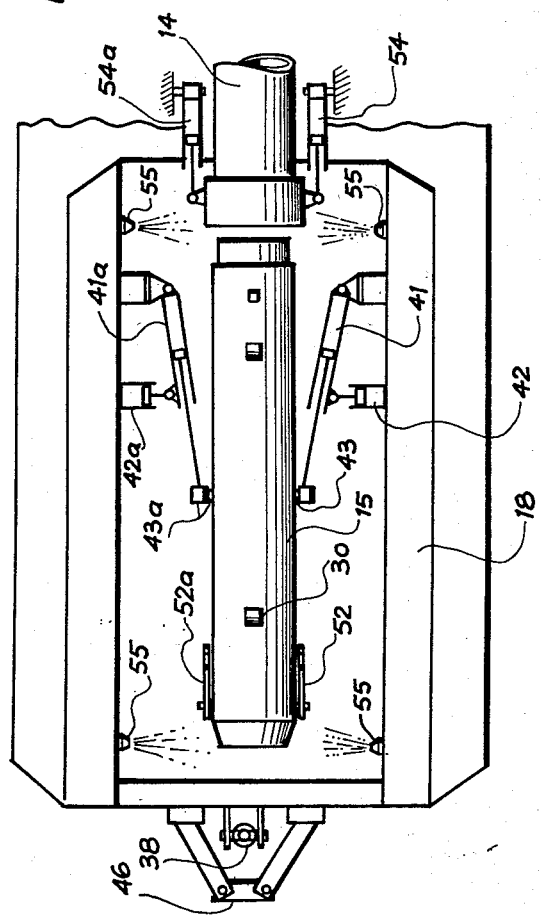
FIG. 9 is a schematic plan view of the means to locate a pipe length for joining to another pipe length.
Figure 10:
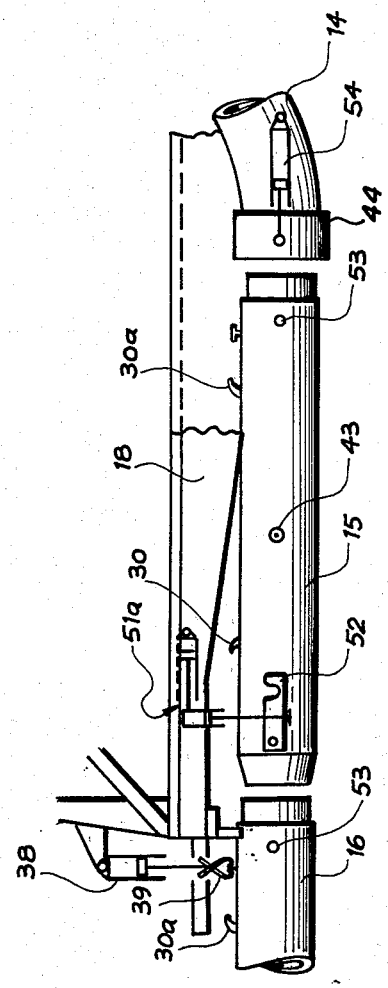
FIG. 10 is an elevation of the components shown in FIG. 9.
Figure 14:
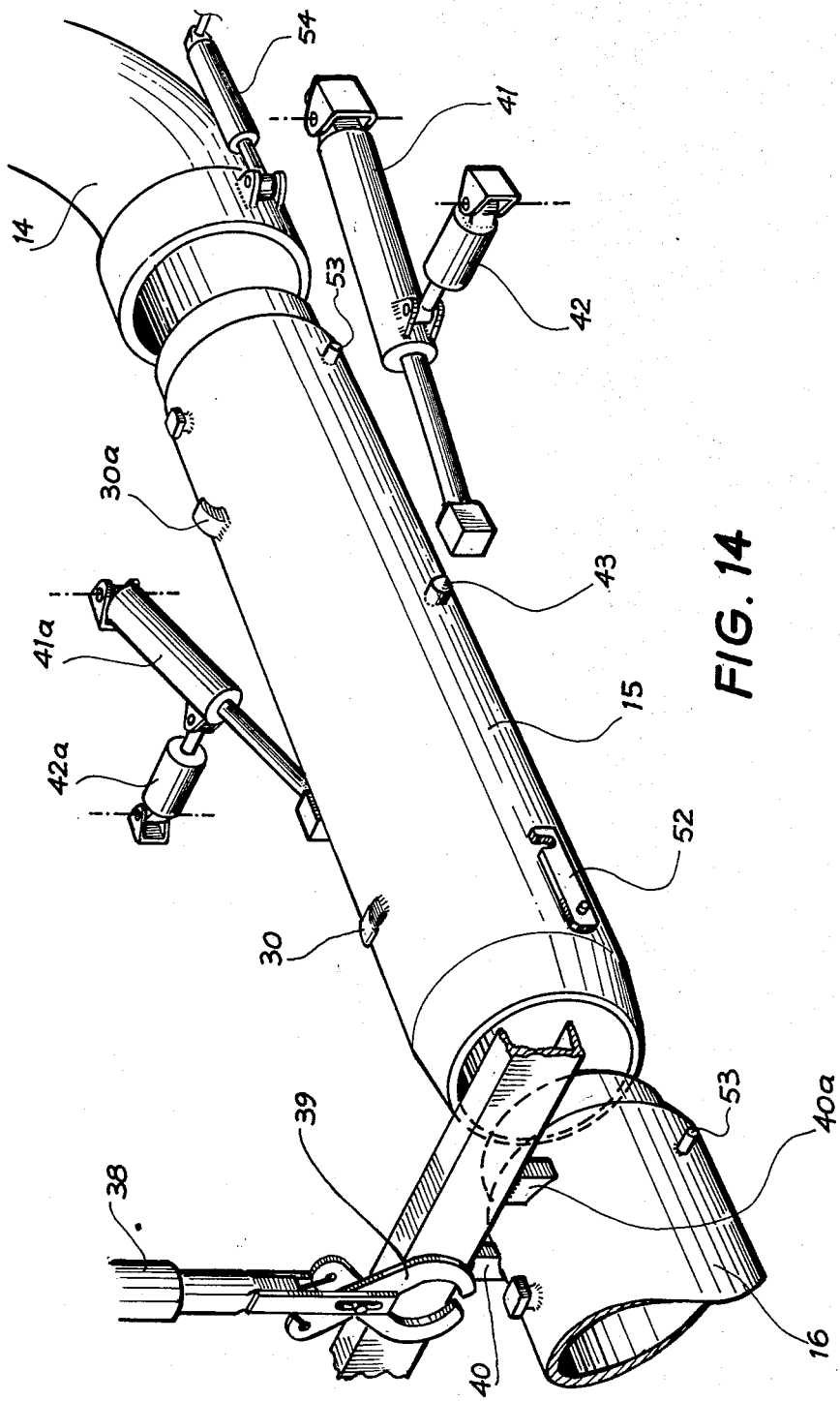
FIG. 14 is a perspective view of the locator means shown in FIGS. 9–11.

To add a pipe length to the last pipe 16 of a pipeline, auxiliary mechanism as illustrated in FIGS. 9 to 11 are used. An auxiliary hydraulically operated piston 38 with a claw 39 is lowered under the control of controller 12. The claw 39 grips and lifts the end of the pipe 16 locating it against stops 40 and 40a on the magazine.

The material conveying means is driven by hydraulic motors 45 and 45a acting on caterpillar tracks 48 and 48a supporting the main base frame 18. Under control of the controller 12, the magazine is precisely positioned by sensors 46 and a new pipe is lowered, as described above, so as to be exactly aligned with the end of the pipe 16. The outer ends of the auxiliary cylinders 41 and 41a are moved horizontally towards the pipe 15 by the cylinders 42 and 42a until conical bosses 43 and 43a on the side of pipe 15 are engaged by the heads on the pistons in the cylinders 41 and 41a. The cylinders 41 and 41a then push the pipe 15 longitudinally into engagement with the pipe 16 and a sleeve 44 on the "Y" connector 14. This operation is effected by lift cylinders 49 (FIG. 1) which are also used to raise the connector 14 giving adequate ground clearance for travel when pipe is not being layed or used for pumping.

A new pipe locks to the pipe 16 as shown in FIG. 2. The output end of the pipe 15 is joined to the input of the pipe 16 and the input of pipe 15 is joined to the "Y" connector 14 by the sleeve 44. Locking is achieved by push and turn hydraulic mechanisms 51a which, under the control of controller 12, extend to engage and rotate catches 52 and 52a on the pipe 15 into engagement with pins 53 on the pipe 16 (FIG. 10). When these catches are engaged, the controller 12 reverses the pressure in the cylinders 41 and 41a and reverses the hydraulic motors 54 and 54a to produce secure engagement between the "Y" connector 14 and the new pipe 15. This operation can be repeated as often as necessary to move all the pipes from the magazine into desired positions. The reverse procedure enables pipes to be disconnected and picked up for storage in the magazine.

To ensure that none of the conveyed material obstructs the ends of the pipes being joined, jets of water, under the control of controller 12, are directed at the ends of the pipes through nozzles 55. These are arranged in sufficient numbers and in positions to ensure clean joints. If extra cleaning precautions are required, a feeder breaker hydraulic motor 56 is stopped and water is introduced into the valve chamber 3 under the control of controller 12 while pumping continues. Consequently, the pipes will be flushed out and the escape of water between the loosely assembled pipes makes clean the pipe surfaces to be butted together.

Obviously, many modifications and variations of the present invention are possible in light of the above teachings. It is to be understood, therefore, that the invention can be practiced otherwise than as specifically described.

What is claimed is:

1. A mobile machine to store lengths of pipe to be added to and then removed from a generally horizontal pipeline connected to a mining machine, said mobile machine comprising a frame to straddle a generally horizontal pipeline, wheel means on the frame to permit the machine to move along the length of the pipeline, a magazine mounted on the frame and adapted to hold the lengths of pipe, pipe location means associated with the magazine and adapted to position any one of the lengths of pipe in a pipe transfer position in said magazine, pipe transfer means mounted on the machine and adapted to alternatively transfer a length of pipe from said pipe transfer position to a pipe handling position exterior of said magazine and return a length of pipe from the pipe handling position to the pipe transfer position, and pipe handling means to axially move the length of pipe in the pipe handling position relative to the machine to engage or disengage an end of the length of pipe with the end of the previously laid pipeline.

2. A machine as claimed in claim 1 wherein said magazine comprises a rotatable member having end plates with at least one pipe holding ring on each end plate concentric with the axis of rotation of said rotatable member, aligned movable securing members on said rings concentrically arranged with respect to the axis of rotation of said rotatable member and adapted to engage the ends of lengths of pipe extending between the rings, a nonrotatable central support means in said magazine, and a pipe gripping and transferring device housed in said central support means and adapted to grip and transfer a length of pipe.

3. A machine as claimed in claim 2 wherein said pipe gripping and transferring device comprises a cylinder with two pistons each having a piston rod, said piston rods extending beyond the ends of said cylinder in opposite directions, a scissor arm arrangement with corresponding ends of the scissor arms pivotally connected to said piston rods and hook means at the other end of said scissor arms to engage exterior hook means on a length of pipe.

4. A machine as claimed in claim 3 wherein said pipe handling means comprises a first hydraulic means to grip and raise the end of a pipeline to a selected elevation and second hydraulic means to laterally locate and axially move a length of pipe held by said pipe gripping and delivery device into end engagement with the end of the pipeline held by said first hydraulic means.

5. A machine as claimed in claim 4 including water jets to spray water under pressure onto the ends of lengths of pipes to be joined to clean the end surfaces thereof.

6. A machine as claimed in claim 1 including a pumping device having an outlet adapted to couple to a pipeline extended or shortened by use of the mechanisms of said machine.

7. A machine as claimed in claim 6 including a commodity storage bin.

8. A machine as claimed in claim 7 including an auger breaker to reduce the commodity to pumpable size pieces and feed same from said bin to said pump.

9. A machine as claimed in claim 7 wherein the magazine, pump and bin are on said machine.

* * * * *